(12) United States Patent
Shveykin et al.

(10) Patent No.: US 10,999,234 B1
(45) Date of Patent: *May 4, 2021

(54) MESSAGE PROCESSING USING MESSAGING SERVICES

(71) Applicant: Amazon Technologies, Inc., Seattle, WA (US)

(72) Inventors: Petr Shveykin, Vancouver (CA); Jakub Wojciak, North Vancouver (CA); Marc John Brooker, Seattle, WA (US); Cecilia Deng, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/518,923

(22) Filed: Jul. 22, 2019

Related U.S. Application Data

(63) Continuation of application No. 15/273,467, filed on Sep. 22, 2016, now Pat. No. 10,361,985.

(51) Int. Cl.
  *G06F 15/16* (2006.01)
  *H04L 12/58* (2006.01)
  *H04L 29/08* (2006.01)

(52) U.S. Cl.
  CPC .......... *H04L 51/30* (2013.01); *H04L 67/26* (2013.01)

(58) Field of Classification Search
  CPC ................. H04L 51/30; H04L 67/26
  USPC ........................................ 709/206
  See application file for complete search history.

(56) References Cited

U.S. PATENT DOCUMENTS

2011/0082944 A1* 4/2011 Swanson ........... H04L 29/08081
709/231

\* cited by examiner

*Primary Examiner* — Wing F Chan
*Assistant Examiner* — Joseph R Maniwang
(74) *Attorney, Agent, or Firm* — Knobbe, Martens, Olson & Bear, LLP

(57) ABSTRACT

A message processing technology is provided that includes subscription of stateless compute functions to messaging queues of the message queueing service. The message queueing service may be configured to provide highly scalable hosted messaging queues for reliable delivery of messages. When messages are received in a messaging queue, then a stateless compute function, of a serverless compute service, that is subscribed to the messaging queue may be invoked to process the message. The serverless compute service manages compute resource for execution of the stateless compute function in response to dynamic message traffic.

19 Claims, 7 Drawing Sheets

US 10,999,234 B1

MESSAGE PROCESSING USING MESSAGING SERVICES

BACKGROUND

Some computing systems offer centralized, virtual computing options known as hosted compute services in a service provider environment that may reduce overall costs, improve availability, improve scalability, and reduce time to deploy new applications. For example, some computing systems may act as a service that provides virtual computing, virtual storage, virtual networking and other virtual services as purchased for variable use periods or on a pay-per-use basis (e.g., pay for a certain amount of API (application program interface) transactions or bandwidth) from large pools of re-purposable, multi-tenant computing resources or services.

Such service provider environments may also enable communication by sending and receiving programmatic messages via managed messaging services for network applications. For example, message queueing services have been developed to provide scalable hosted message queues to facilitate exchange of messages over a network (e.g., the internet or wide area networks). Data may be moved between distributed components of a computing system that perform different tasks without losing messages or specifying each component to be always available. Applications can quickly and reliably queue messages that one component generates to be consumed by another component in the system. Accordingly, components of a computing system may be decoupled so that they can run independently.

DETAILED DESCRIPTION

The present technology uses a message queueing service and a serverless compute service in a service provider environment to provide message processing. To implement message processing, a stateless compute function of a serverless compute service may be subscribed to a messaging queue of a message queueing service. The message queueing service may provide scalable hosted message queues to facilitate exchange of messages over a network. Each message queue may receive and store messages from one or more message producers. Therefore, the message queueing service may provide for reliable delivery of messages. When messages are received, the stateless compute function subscribed to the messaging queue is automatically invoked to process the message. The stateless compute function may be subscribed to a messaging queue by one or more parameters specifying the messaging queue as a source of the messages for the stateless compute function. Alternatively, the stateless compute function may be specified as the recipient of messages from the messaging queue. Invoking the stateless compute function may include the compute service pulling a message from the messaging queue of the message queueing service and providing the message to the stateless compute function for processing. Alternatively, invoking the stateless compute function may include the message queuing service pushing a received message to the stateless compute function of the serverless compute service.

The serverless compute service may automatically run program code that provides and executes a stateless compute function for processing the messages. The stateless compute functions may be user developed program code, service provided code, or third party code. The stateless compute functions has no awareness of or state interaction with the underlying infrastructure, so that serverless compute service can rapidly launch as many copies of the function as needed to scale to the rate of incoming messages. The serverless compute service may automatically manage the compute resources in use by the stateless compute function. The serverless compute service may automatically provision back-end services or decommission such services depending upon the message or event load. In this way, a customer or user need not configure the underlying infrastructure necessary for running the stateless compute function. Instead, the serverless compute service provider manages the infrastructure.

Figure 1:
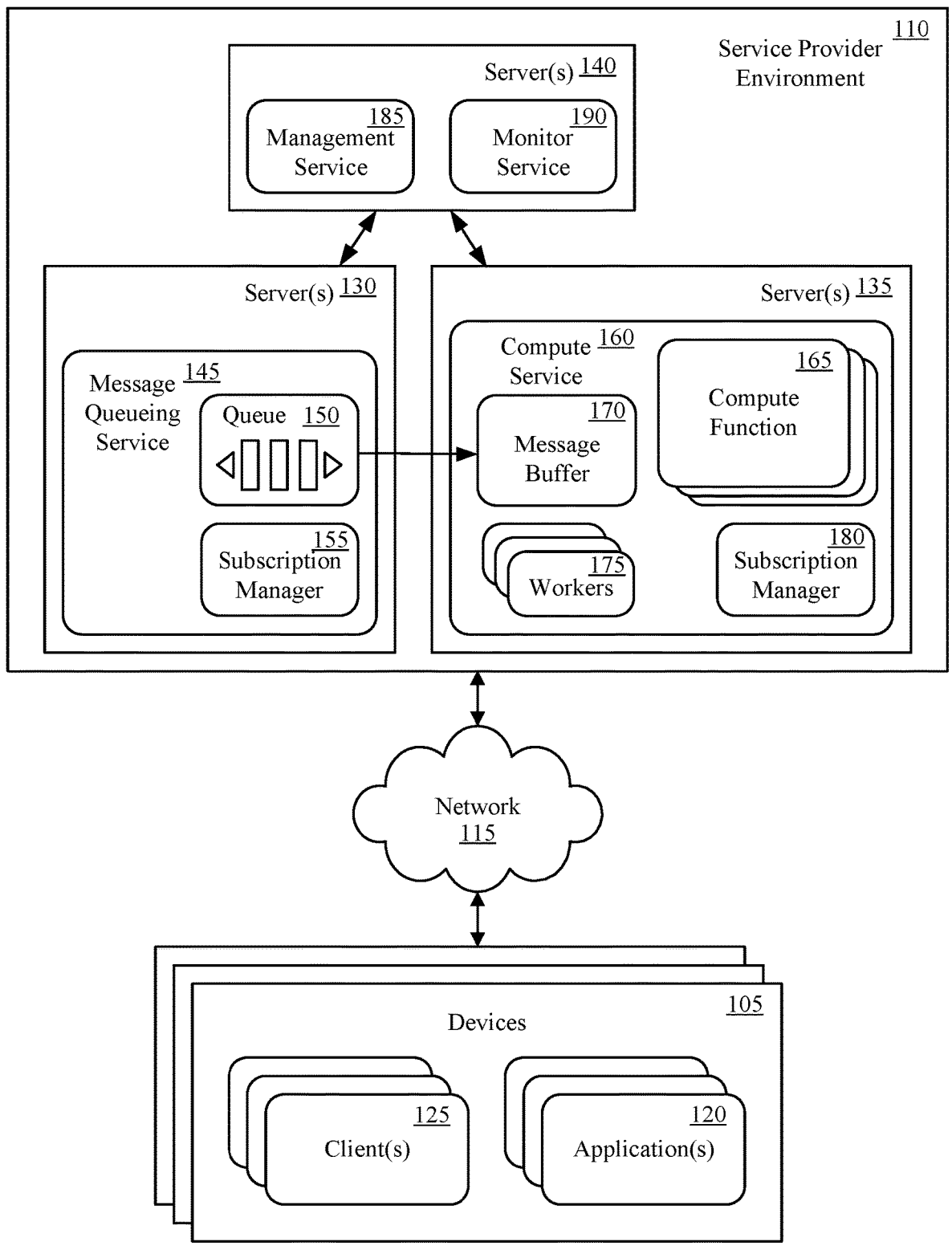
FIG. 1 is a block diagram illustrating components of a message processing system in a service provider environment according to an example of the present technology.

FIG. 1 illustrates components of a message processing system in a service provider environment according to an example of the present technology. The system may include a plurality of devices 105 in communication with a service provider environment 110 via one or more networks 115. The devices 105 can include any network addressable device configured to communicate over a network 115.

The devices 105 may provide computing resources and one or more applications 120 and/or access by one or more clients 125. The service provider environment 110 may include one or more servers 130, 135, 140 for executing computing instances (e.g., virtual machines) as described in relation to FIG. 2. The computing instances may host various services associated with the one or more devices 105.

One or more servers 130 may include one or more computing instances that host a message queueing service 145. In one aspect, the message queueing service 145 may be a distributed messaging service that supports exchange of messages over the network 115. The message queueing service 145 may be configured to provide scalable hosted messaging queues that provide highly available messaging in message producer-consumer configurations and scalable connectivity between message producers and message consumers.

In one aspect, the message queueing service 145 includes one or more messaging queues 150 and optionally a subscription manager 155. The subscription manager 155 may enable customers, clients 125 or applications 120 to subscribe to a named queue 150 for messaging. Each queue 150 may receive messages from one or more message producers.

One or more servers 135 may include one or more computing instances that host a serverless compute service 160. The serverless compute service 160 allows for running code without provisioning or managing servers. Therefore, developers do not need to actively manage infrastructure but may simply execute stateless compute functions 165 upon request by a customer. Computing resources of a service provider environment 110 can be used as services without having to manage physical capacities or limits. The service provider instead manages the infrastructure for the customers.

The serverless compute service 160 can provide one or more stateless compute functions 165. The serverless compute service may run code for an independent computing function 165 and automatically manage compute resources for execution of the code of the computing function. A stateless compute function 165 may be a segment of program code that can receive parameters, perform processing and provide return values. The stateless compute functions may be user developed program code, service provided code, or third party code. The stateless compute functions can perform any number of and/or types of operations based upon the message. Operations performed by stateless compute functions may include forwarding the received message to other messaging queues or message notification services. Operations performed by stateless compute functions may include uploading images, responding to website clicks, reacting to sensor reading from an Internet-of-things (IoT) connected device.

In one aspect, the program code may execute on a managed compute service platform for web services that runs a defined program code in a container on a computing instance. The program code may execute in a hosted compute service that runs code in response to requests to execute the program code, and automatically manages the compute resources used by that program code. Once a program code has been executed and the appropriate results have been returned, the program code and results may be flushed from memory of the computing instance or container in which the program code was executing. The program code provides for building smaller, on-demand applications that may be responsive to events and new information. For example, the program code may be used to automatically provision back-end services triggered by custom program code requests. In one aspect, the program code may be triggered in response to an event, may execute or perform a function in response to the event, and may return a response or value. In another aspect, the program code may execute as a batch process, and may return response data or values. For example, multiple stateless compute functions 165 may be executed as a batch in response to an event and/or group of events.

The serverless compute service 160 may invoke a given stateless compute function 165 in response to image uploads, website clicks, sensor readings from an IOT device, or numerous other events. The stateless compute function 165 may forward the message to other message queueing services or notification service topics based on message attributes, upload the message to a file storage network service, publish a metric to a network monitoring service, and numerous other operations.

In one aspect, the serverless compute service 160 may include one or more stateless compute functions 165, a message buffer 170 associated with each compute function 165, one or more workers 175, and optionally a subscription manager 180. The message buffer 170 receives a message for an associated stateless compute function 165 and stores the messages until the messages are requested or read. An instance of a given stateless compute function can be executed by one or more workers 175.

One stateless compute function 165 may be subscribed to one messaging queue 150 of the message queueing service 145. In one aspect, the subscription manager 155, 180, of either the message queueing service 145 or serverless compute service 160, may include subscription information for each of one or more message queues 150 of the message queueing service 145 and an associated stateless compute function 165. In one example, a resource name of the stateless compute function may be specified in the subscription information for the messaging queue. In another example, a resource name of the messaging queue may be specified in the subscription information as an event source of the stateless compute function. The subscription management component 155, 180 may also include any number of rules for managing and executing the message queueing service and/or serverless compute service 160, such as access policies and/or access permissions for each subscription of a given stateless compute function 165 to the associated messaging queue 150.

After a stateless compute function 165 is subscribed to a messaging queue 150, the stateless compute function 165 may be invoked for one or more messages in the messaging queue 150. In one aspect, the message received in a messaging queue 150 may be pushed on a message receipt event basis to the serverless compute service 160 and may trigger the associated stateless compute function 165, according to one or more subscription parameters in the subscription manager 155 of the message queueing service 145. In another aspect, the serverless compute service 160 may pull a message received in the messaging queue 150 on a message receipt event basis for processing by the associated stateless compute function 165, according to one or more subscription parameters in the subscription manager 180 of the serverless compute service 160. The messages may be pulled from the message queue 150 using the workers 175 or worker nodes. In another instance, a plurality of messages in the messaging queue 150 may be pushed to the serverless compute service 160 for batching processing by the associated stateless compute function 165, according to one or more subscription parameters in the subscription manager 155 of the messaging queueing service 145. In yet another aspect, the serverless compute service 160 pulls a plurality of messages from the messaging queue 150 as a batch for processing by the associated stateless compute function, according to one or more subscription parameters in the subscription manager 180 of the serverless compute service 160. With regard to batch processing, it is to be appreciated that the messages received by the messaging queue may represent respective events. Invoking the stateless computing function to process one or more messages in a respective batch changes the processing of messages from event driven to a batch driven process. Accordingly, a subscription between a messaging queue 150 and a stateless compute function 165 may operate on an event driven basis (e.g., one or more events drive the execution of stateless compute functions 165), or may provide for a conversion or translation between an event driven process to a batch driven process.

In addition, the stateless compute function 165 may invoke one or more additional stateless compute functions to provide one or more additional computing functions to the original stateless compute function 165. The stateless compute functions 165 may also call any available resources in the service provider environment, including, but not limited to, data storage resources (e.g., record level or block level resources, etc.), networking resources, database resources, cluster computing resources, content delivery, compute resources, security resources, or any other resources in the service provider environment 110.

The output of the stateless compute functions 165 may be another message for the message queue, sending data to an object data store in a service provider environment 110, or writing records to a NoSQL data store or a relational data store. Additionally, the work performed by the stateless compute functions 165 may invoke the launching of virtual resources in the service provider environment 110. For example, the stateless compute functions 165 may launch computing instances, distributed applications, cluster processing, launch templates, networking functions (e.g., hacking counter-measures in response to the message) or other virtualized compute processes.

One or more servers 140 may include one or more computing instances that host one or more management services and/or one or more monitor services. In one aspect, a management service can track one or more parameters or configurations of the message queueing service 145 and/or serverless compute service 160 for one or more customer accounts. In one aspect, a monitor service may report one or more parameters or metrics of the message queueing service 145 and/or serverless compute service 160 for a user, and provide an interface for configuring operation of the message queueing service 145 and/or serverless compute service 160.

The previously existing technology provides configurations where clients may manage a fleet of workers or worker nodes to process messages received by the message queueing service and write corresponding "glue code," (e.g., code that manages the fleet of workers or worker nodes to process the messages). Since it may be difficult to know how many threads/servers are needed, and manage scaling up and down quickly according to dynamic message traffic, these operations are better managed by serverless compute service 160 or messaging queueing service 145. Accordingly, the present technology has provided improved techniques for processing messages where customers do not need to manage the workers or "glue code", as discussed above.

Figure 2:
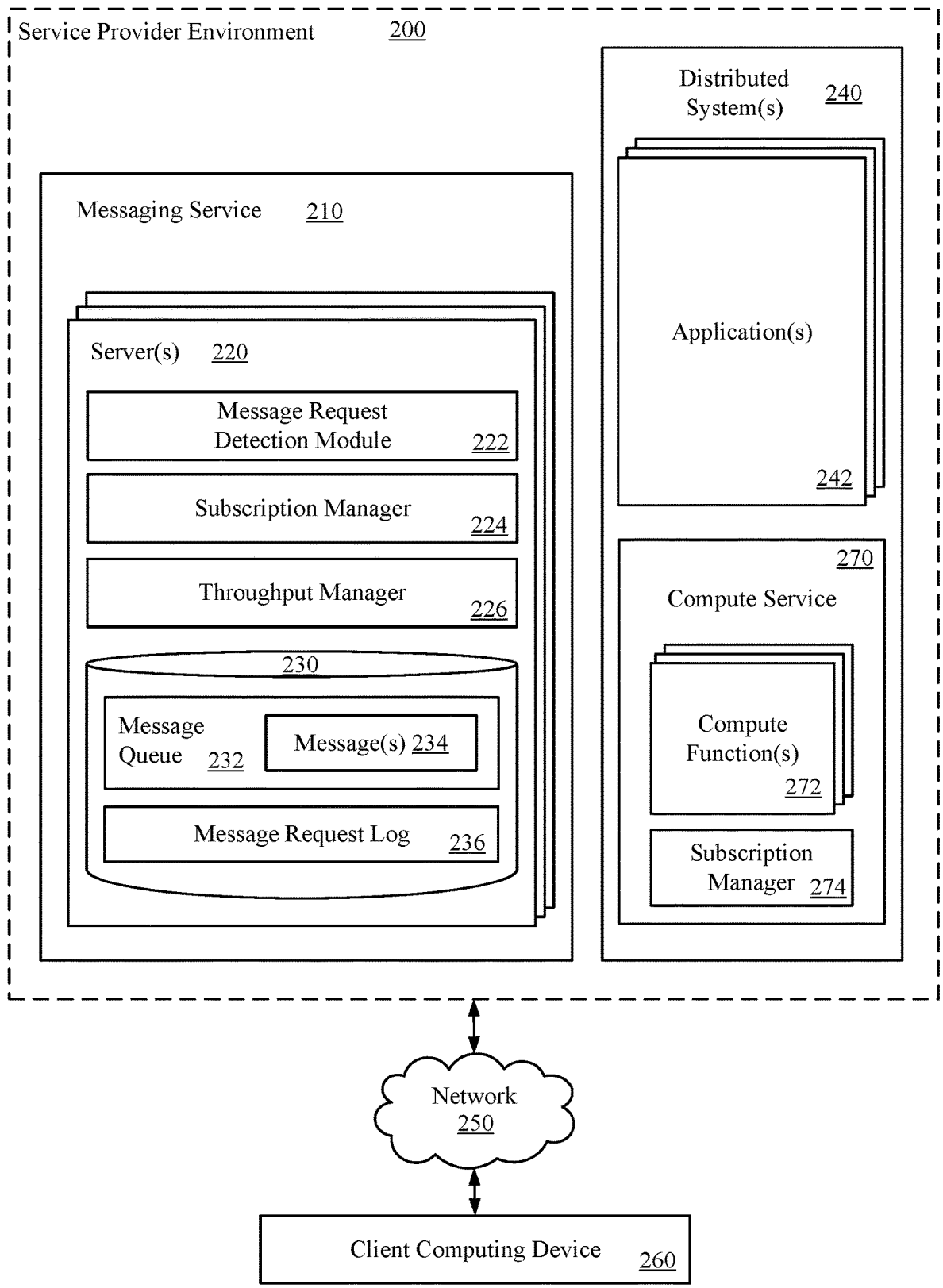
FIG. 2 is a block diagram illustrating components of a message processing system in a service provider environment according to another example of the present technology.

FIG. 2 illustrates components of a message processing system in a service provider environment according to another example of the present technology. The service provider environment 200 may include a messaging service 210 and a distributed system 240 of one or more applications that run on servers, clusters, computing instances, directly on hardware. The distributed system 240 may include a plurality of applications 242 and a serverless compute service 270.

For example, the applications 242 may be associated with a distributed application (e.g., a web application) executing in the service provider environment 200. The messaging service 210 may operate one or more servers 220 and data store(s) 230 to store messages 234 in a message queue 232. The messages 234 may be used by the applications 242 of the distributed system 240 or by a client computing device(s) 260. The messaging service 210 may be in communication with a client computing device 260 via a network 250.

In one example, the data store 230 may include messages 234. The messages 234 may be included in the message queue 232 maintained by the messaging service 210. The messages 234 may be exchanged between the applications 242 of the distributed system 240 through the messaging service 210. For example, messages 234 may be generated by a first application component of the distributed system 240, and the messages 234 may be consumed by a second application component of the distributed system 240. Similarly, message 234 may be generated by an application component of the distributed system 240, and the messages 234 may be consumed by a stateless compute function 272 of a serverless compute service 270. The messages 234 may be stored in the data store 230 until the messages 234 are processed by one or more applications 242 at which point the messages may be deleted by the applications 242 or clients. Similarly, the messages 234 may be stored in the data store 230 until the messages 234 are processed by a stateless compute function 272 of the computer service 270. The messages 234 may be communicated between the applications 242 in order to coordinate actions performed by the applications 242. The messages 234 may contain up to a defined amount of text in a defined format (e.g., 256 KB of text). The messages 234 may include various functions, parameters, attributes, settings, etc. to be implemented at the applications 242 that consume the messages 234. In addition, a message 234 may include sequencing information, such that the messages 234 may be reordered after being accessed by the applications 242.

The message request detection module 222 may be configured to detect a plurality of message requests that are sent from the applications 242 to the message queue 232 managed by the messaging service 210. The message requests from the applications 242 may include requests to send messages 234 to the message queue 232, requests to receive messages 234 from the message queue 232, and requests to delete messages 234 from the message queue 232. In one example, the message request detection module 222 may be an agent or worker process that intercepts message requests sent from the applications 242 of the distributed system 240. In other words, the message request detection module 222 may detect message requests that are received from the applications 242 and are destined for the message queue 232.

In one example, the data store 230 may include a message request log 236. The message request log 236 may indicate a plurality of message requests sent by the applications 242 of the distributed system 240. The message requests may be sent from the applications 242 to the messaging service 210. The message requests may include requests to send messages 234 to the message queue 232, requests to receive messages 234 from the message queue 232 and requests to delete messages 234 from the message queue 232. In addition, the message request log 236 may include message attribute information for the message request included in the message request log 236.

The server(s) 220 operated by the messaging service 210 may include a number of modules for generating a message request log 236 using message requests from the applications 242 or other clients. The server(s) 220 may include a message request detection module 222, a subscription manager 224, a throughput manager 226 and other applications, services, processes, systems, engines, or functionality not discussed in detail herein.

The serverless compute service 270 can provide one or more stateless compute functions 272. The stateless compute functions 272 may be any type of user developed program code, service provided code, or third party code. One stateless compute function 272 may be subscribed to one messaging queue 234 of the message queueing service 210. In one aspect, the subscription manager 224, 274, of either the message queueing service 210 or serverless compute service 270, may include subscription information for the one or more message queues 232 of the message queueing service 210 and an associated stateless compute function 272. In one example, a resource name of the stateless compute function may be specified in the subscription information for the messaging queue. In another example, a resource name of the messaging queue may be specified in the subscription information as an event source of the stateless compute function. The subscription management 224, 274 may also include an access policy and/or access permissions for a subscription of a given stateless compute function 272 to the associated messaging queue 232.

In one aspect, a message 234 received in a given messaging queue 232 may be pushed on an event basis to the serverless compute service 270 and may trigger the associated stateless compute function 272, according to one or more subscription parameters in the subscription manager 224 of the message queueing service 210. In another aspect, the serverless compute service 270 pulls on an event basis the message 234 received in the messaging queue 232 for processing by the associated stateless compute function 272, according to one or more subscription parameters in the subscription manager 274 of the serverless compute service 270. In another instance, a plurality of messages are pushed from the message queue 232 to the associated stateless compute function 272 for batching processing. In yet another aspect, the serverless compute service 270 pulls a plurality of messages from the messaging queue 232 as a batch for processing by the associated stateless compute function 272. A throughput manager 226 may control operations according to the subscription to operate the messaging queue 232 and stateless compute functions 272 on an event driven basis or a batch process basis.

The throughput manager 226 may be implemented in the messaging service 210, as illustrated in FIG. 2, in the serverless compute service 270, or as a separate application, service, process, engine, module, route, or utility distributed using multiple subcomponents between the messaging service 210 and serverless compute service 270. In one example, the throughput manager 226 may pass a plurality of messages as a batch from the messaging queue 232 and invoke the subscribed stateless compute function 272 to process the batch of messages periodically, at a predetermined time, or some other schedule as specified as part of the corresponding subscription information. In another example, the throughput manager 226 may track one or more metrics of the messages stored in the messaging queue 232, such as the number of messages 234 currently in the queue, the rate at which messages are being received into the messaging queue 232, and the pricing of the messaging queueing 232 service at the time. The throughput manager 226 may also or in the alternative, track one or more metrics of the serverless compute service 270, such as the pricing of the stateless compute function 272 at the time, and the size of the stateless compute function fleet. The throughput manager 226 may control invocation of the computer function 272 based upon the tracked one or more messaging service metrics and/or computing service metrics.

The various processes and/or other functionality contained within the service provider environment 200 may be executed on one or more processors that are in communication with one or more memory modules. The service provider environment 200 may include a number of computing devices that are arranged, for example, in one or more server banks or computer banks or other arrangements. The computing devices may support a computing environment using hypervisors, virtual machine managers (VMMs) and other virtualization software.

The term "data store" may refer to any device or combination of devices capable of storing, accessing, organizing and/or retrieving data, which may include any combination and number of data servers, relational databases, object oriented databases, cluster storage systems, data storage devices, data warehouses, flat files and data storage configuration in any centralized, distributed, or clustered environment. The storage system components of the data store may include storage systems such as a SAN (Storage Area Network), cloud storage network, volatile or non-volatile RAM, optical media, or hard-drive type media. The data store may be representative of a plurality of data stores as can be appreciated.

The network 250 may include any useful computing network, including an intranet, the Internet, a localized network, a wide area network, a wireless data network, or any other such network or combination thereof. Components utilized for such a system may depend at least in part upon the type of network and/or environment selected. Communication over the network may be enabled by wired or wireless connections and combinations thereof.

FIG. 2 illustrates that certain processing modules may be discussed in connection with this technology and these processing modules may be implemented as computing services. In one example configuration, a module may be considered a service with one or more processes executing on a server or other computer hardware. Such services may be centrally hosted functionality or a service application that may receive requests and provide output to other services or consumer devices. For example, modules providing services may be considered on-demand computing that are hosted in a server, virtualized service environment, grid or cluster computing system. An API may be provided for a module to enable a second module to send requests to and receive output from the first module. Such APIs may also allow third parties to interface with the module and make requests and receive output from the modules. While FIG. 2 illustrates an example of a system that may implement the techniques above, many other similar or different environments are possible. The example environments discussed and illustrated above are merely representative and not limiting.

Figure 3:
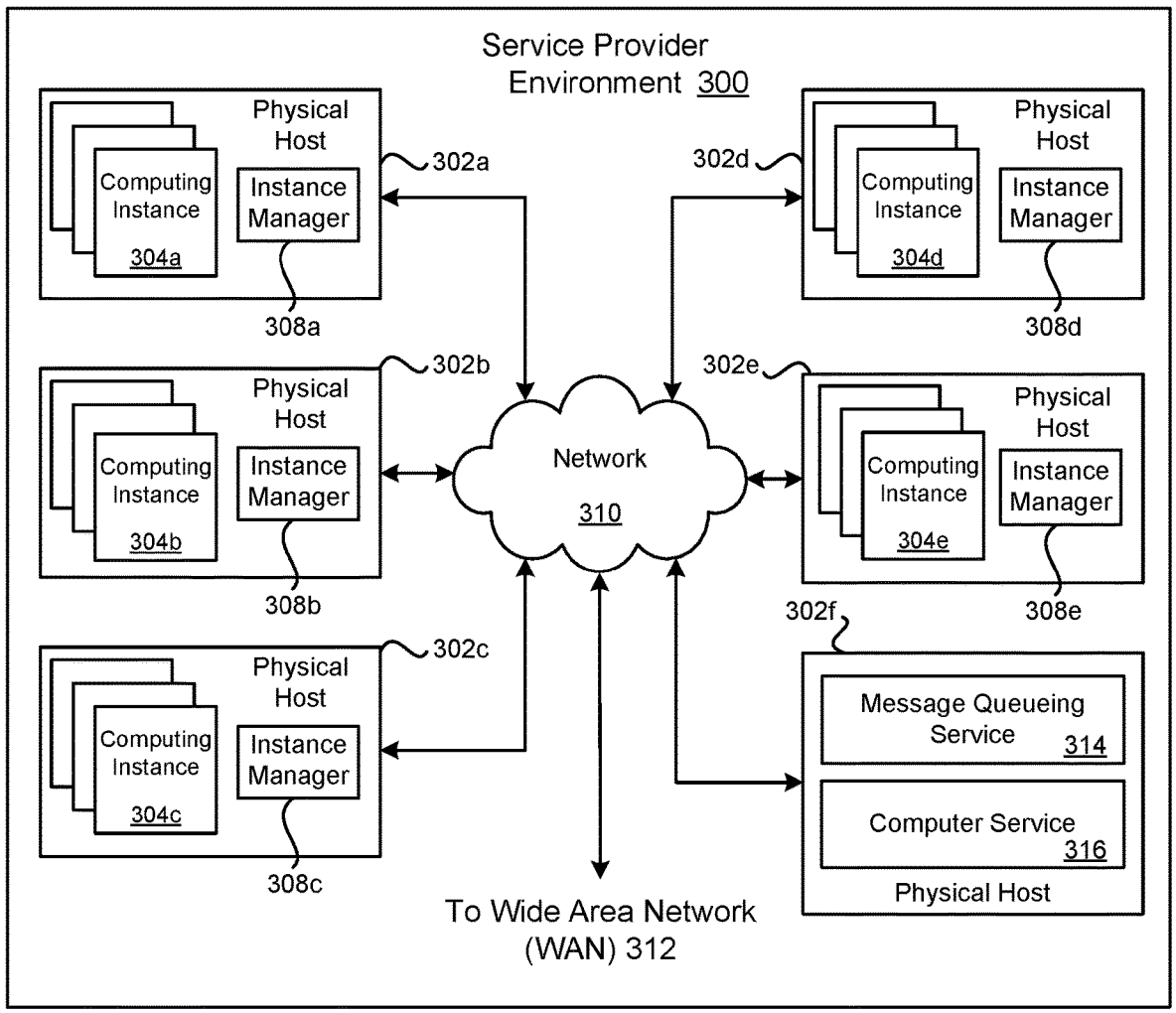
FIG. 3 is a block diagram that illustrates an example service provider environment that may be used to execute and manage a number of computing instances on which the present technology may be executed.

FIG. 3 illustrates an example service provider environment that may be used to execute and manage a number of computing instances on which the present technology can be executed. In particular, the service provider environment 300 illustrates one environment in which the technology described herein may be used. The service provider environment 300 may be one type of environment that includes various virtualized service resources that may be used, for instance, to host computing instances 304a-e.

The service provider environment 300 may be capable of delivery of computing, storage and networking capacity as a software service to a community of end recipients. In one example, the service provider environment 300 may be established for an organization by or on behalf of the organization. That is, the service provider environment 300 may offer a "private cloud environment." In another example, the service provider environment 300 may support a multi-tenant environment, wherein a plurality of customers may operate independently (i.e., a public cloud environment). Generally speaking, the service provider environment 300 may provide the following models: Infrastructure as a Service ("IaaS"), Platform as a Service ("PaaS"), and/or Software as a Service ("SaaS"). Other models may be provided. For the IaaS model, the service provider environment 300 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on a hosted compute service provided by the service provider environment 300 without incurring the cost of buying and managing the underlying hardware and software. The SaaS model allows installation and operation of application software in the service provider environment 300. End customers may access the service provider environment 300 using networked client devices, such as desktop computers, laptops, tablets, smartphones, etc. running web browsers or other lightweight client applications, for example. Those familiar with the art will recognize that the service provider environment 300 may be described as a "cloud" environment.

The particularly illustrated service provider environment 300 may include a plurality of physical hosts 302a-f. While six physical hosts are shown, any number may be used, and large data centers may include thousands of physical hosts. The service provider environment 300 may provide computing resources for executing computing instances 304a-e. Computing instances 304a-e may, for example, be virtual machines. A virtual machine may be an instance of a software implementation of a machine (i.e. a computer) that executes applications like a physical machine. In the example of a virtual machine, each of the physical hosts 302a-f may be configured to execute an instance manager 308a-e capable of executing the instances. The instance manager 308a-e may be a hypervisor, virtual machine monitor (VMM), or another type of program configured to enable the execution of multiple computing instances 304a-e on a single server. Additionally, each of the computing instances 304a-e may be configured to execute one or more applications.

A physical host 302f may execute a message queueing service 314 configured to execute a distributed messaging service that supports programmatic exchange of messages via network service application as a way to communicate over a network. In one example, the message queueing service 314 may be hosted by one or more computing instances 304a-e. One or more physical host 302f may execute serverless compute services 316 configured to execute one or more computing functions in response to events and automatically manage compute resources for execution of the code. In one example, serverless compute service 316 may be hosted by one or more computing instances 304a-e. In some examples, one or more computing instances 304a-e may be configured to host instances of the message queueing service 314 and serverless compute service 316 that can process messages according to given stateless compute functions subscribed to associated messaging queues of the message queueing service 314.

A network 310 may be utilized to interconnect the service provider environment 300 and the physical hosts 302a-f, 314. The network 310 may be a local area network (LAN) and may be connected to a Wide Area Network (WAN) 312 or the Internet, so that end customers may access the service provider environment 300. The network topology illustrated in FIG. 3 has been simplified, many more networks and networking devices may be utilized to interconnect the various computing systems disclosed herein.

Figure 4:
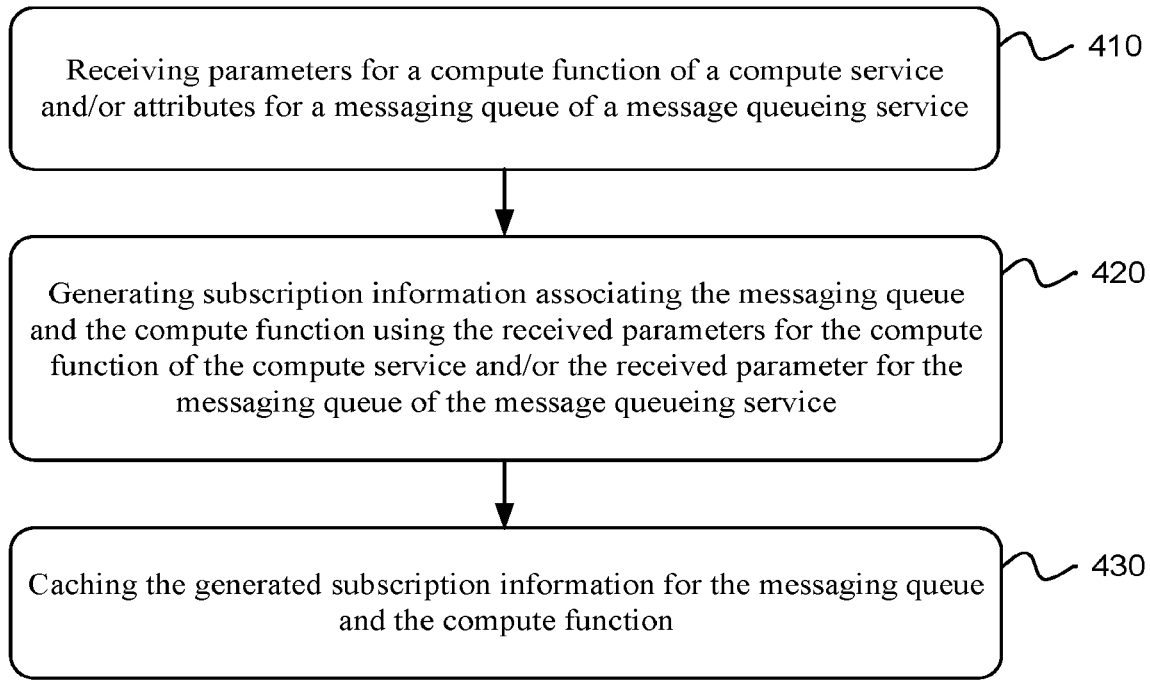
FIG. 4 is a flowchart of an example method for configuring a message processing system in a service provider environment according to an example of the present technology.

FIG. 4 illustrates an example method for configuring a message processing system in a service provider environment according to an example of the present technology. The method can be implemented by one or more processors and memory, wherein the memory stores one or more sets of instructions, that, when executed by the one or more processors, perform one or more functionalities including subscribing a stateless compute function of a serverless compute service to a queue of a message queueing service.

As in block 410, parameters of a stateless compute function executable in a serverless compute service and attributes of a messaging queue of a message queueing service are received. In one aspect, parameters identifying the serverless compute service and/or the stateless compute function may be received. In addition, parameters specifying attributes or settings for the serverless compute service and/or the given stateless compute function can be received. Similarly, parameters identifying the message queueing service and/or the given messaging queue, and/or specifying attributes of the message queueing service and/or the given messaging queue may be received. The received parameters may also include access permissions and/or policies related to the serverless compute service, the given stateless compute function, the message queueing service and/or the given messaging queue. The parameters may include one or more of the resource names or function names of the serverless computer service, the stateless compute function, the message queueing service, and the messaging queue. The parameters may also include parameters for the message queuing service application programming interface (API), parameters for the stateless compute function API, how many messages to process in a batch, setting, configurations and other similar parameters.

At block 420, subscription information associating the messaging queue and the stateless compute function is generated using the received parameters for the stateless compute function of the serverless compute service and/or the received parameters for the messaging queue of the message queueing service. In one example, a resource name of the stateless compute function may be specified in the subscription information for the messaging queue. In another example, a resource name of the messaging queue may be specified in the subscription information as an event source of the stateless compute function.

In one aspect, the subscription information may also include any type of rule and include one or more access permissions and/or policies. In one example, permissions for actions such as setting messaging queue attributes and receiving messages may be included in the subscription information for the messaging queue. Similarly, permission for actions such as invoking a stateless compute function may be included in the subscription information for the stateless compute function.

At block 430, the subscription information for the given messaging queue and the given stateless compute function can be stored. In example, the subscription information may be provided to a subscription manager of the message queueing service and/or the serverless compute service. The method for configuring the message processing system may also be performed to change the subscription information, thereby allowing dynamic subscription of the messaging queue to the stateless compute function(s). For example, parameters of a new stateless compute function and/or attributes of a new messaging queue can be received, and a new subscription may be generated and stored according to processes 410-430.

Figure 5:
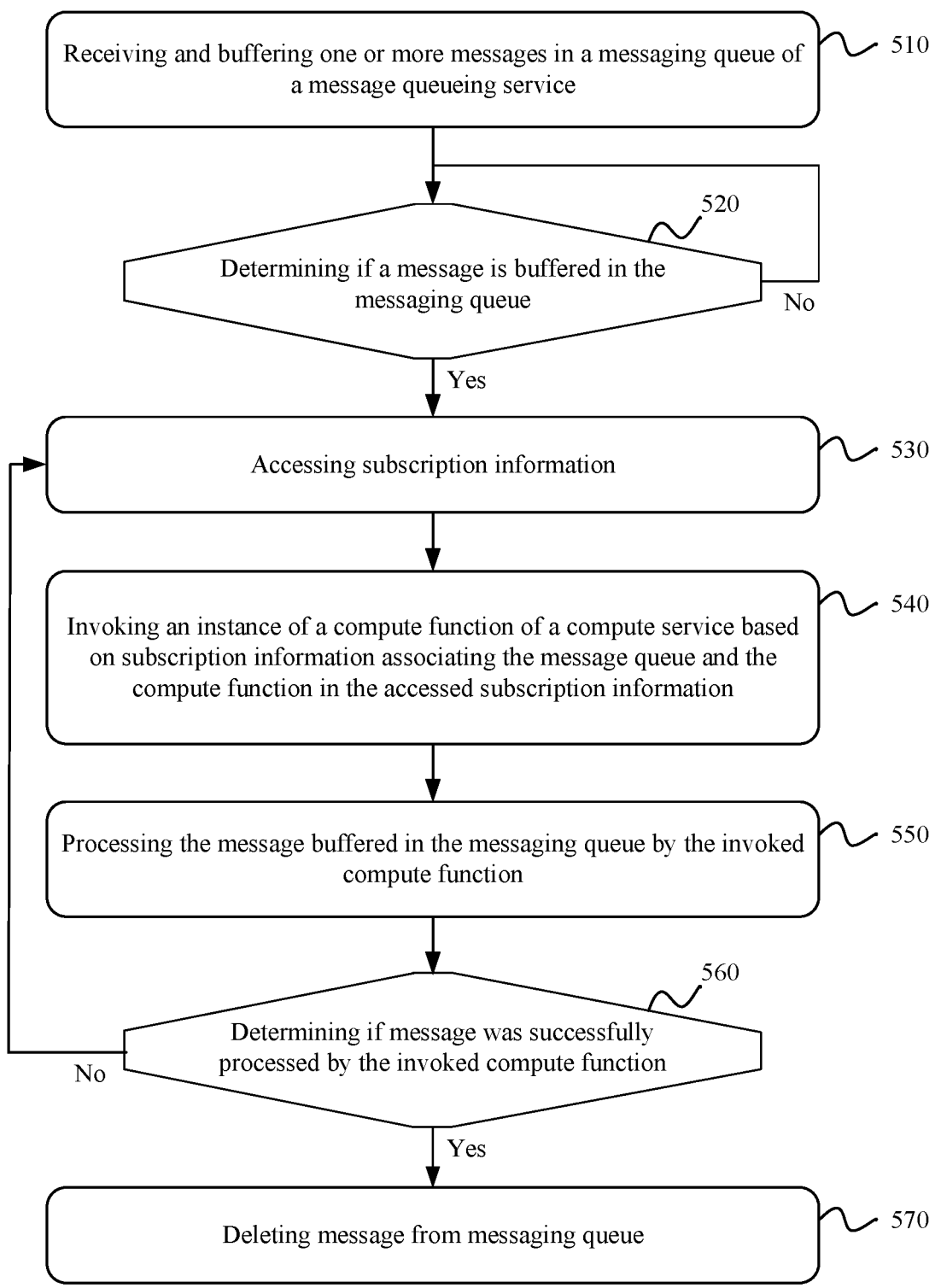
FIG. 5 is a flowchart of an example method for message processing system in a service provider environment according to an example of the present technology.

FIG. 5 illustrates an example method for a message processing system in a service provider environment according to an example of the present technology. As in block 510, one or more messages can be received and stored in a messaging queue of a message queueing service. In one aspect, the message queueing service can persist messages in the queue. In one aspect, the message queueing service may also return a response to a message producer for messages received in the queue.

At block 520, it can be determined if a new message is buffered in the messaging queue. At block 530, if a new message is buffered in the messaging queue, subscription information can be accessed. At block 540, an instance of a stateless compute function of a serverless compute service can be invoked based on subscription information associating the messaging queue and the stateless compute function in the accessed subscription information. In one aspect, a worker of the serverless compute service can pull messages from the messaging queue of the message queueing service according to subscription information maintained by a subscription manager of the serverless compute service. In another alternative aspect, messages received in the messaging queue can be pushed to a corresponding buffer for the stateless compute function of the serverless compute service according to the subscription information maintained by a subscription manager of the message queueing service.

In one aspect, the stateless compute function may be invoked on a message event basis. The instance of the stateless compute function may be invoked in response to each message buffered in the messaging queue. In another aspect, the stateless compute function may be invoked on a batch processing basis. The stateless compute function may be invoked to process one or more messages as a batch according to one or more metrics, such as a predetermined date and/or time, a predetermined periodic date and/or time, a predetermined number of messages in the messaging queue, a rate of receipt of messages received in the messaging queue, a size of the stateless compute function fleet, a rate of processing by the stateless compute function, a computing cost schedule, or any other similar metric of the message queueing service or the computing service. The messages in a batch may each be processed by a respective instance of the stateless compute function (e.g. in parallel), or all the messages in the batch may be processed by one instance of the stateless compute function.

In one aspect, the message queueing service can be automatically granted permission to invoke the subscribed stateless compute function of the serverless compute service. In another aspect, the message queueing service may be granted permission to invoke the subscribed stateless compute function of the serverless compute service according to an access policy from the subscription manager of the message queueing service. The access policy may be controlled by the customer's permissions that exist within the service provider environment. In yet another aspect, the serverless compute service may be granted permission to pull messages from the subscribed queue of the message queueing service according to an access policy from the subscription manager of the serverless compute service.

At block 550, the message buffered in the messaging queue may be processed by the invoked stateless compute function. In one aspect, the serverless compute service may access a body of the message, a parameter of the message, and/or metadata of the message. Further, the serverless compute service provides access to a message to another consumer of the message queueing service or another computing resource in the service provider environment. Further, the serverless compute service can modify the body and/or attributes of the message.

In one aspect, the invoked stateless compute function may invoke one or more additional stateless compute functions to further process the message or perform one or more additional functions in response to the processed message. In another aspect, the invoked stateless compute function may call another computing environment service or system for processing the message. In some configurations, multiple stateless compute functions cannot be subscribed to the same messaging queue. However, an individual stateless compute function may be subscribed to an individual queue. The subscribed stateless compute function may in turn call multiple additional stateless compute functions either sequentially or in parallel.

At block 560, it can be determined if the message was successfully processed by the invoked stateless compute function. The calling of the serverless compute service may be retried if the message was not successfully processed by the invoked stateless compute function. In one aspect, each call of the stateless compute functions in the serverless compute service may count toward an invocation limit of a client account associated with the message queueing service, but in some configurations, the number of stateless compute functions that are callable may be unbounded. In one aspect, a given message can be maintained for a configured message retention period of the message queueing service.

Calling of the serverless compute service may be retried until the call succeeds or the message expires. In one aspect, calling the serverless compute service can be retried according to a redrive policy (i.e., a retry policy) if invocation of the serverless compute service fails. The message can be moved to a Dead Letter Queue (DLQ) after a maximum number of retries of the redrive policy. If a redrive policy is not configured, calling of the serverless compute service can be retried until the message expires or the call to the serverless compute service succeeds. Accordingly, it is preferred for a redrive policy to be configured to avoid unnecessary service charges.

At block 570, the message can be deleted from the messaging queue if the message was successfully processed by the invoked stateless compute function. The message may be actively deleted from the messaging queue by worker process, a worker node, a client, or a customer.

In one aspect, the latency of calls may not be affected by the addition of the present technology to messaging queues because the message queueing service can persist the message, return a response to the message producer, and then call the subscribed stateless compute function. In one aspect, the stateless compute functions are designed to process events within milliseconds. However, latency may be higher immediately after a stateless compute function is created, updated, or if it has not been used recently.

Figure 6:
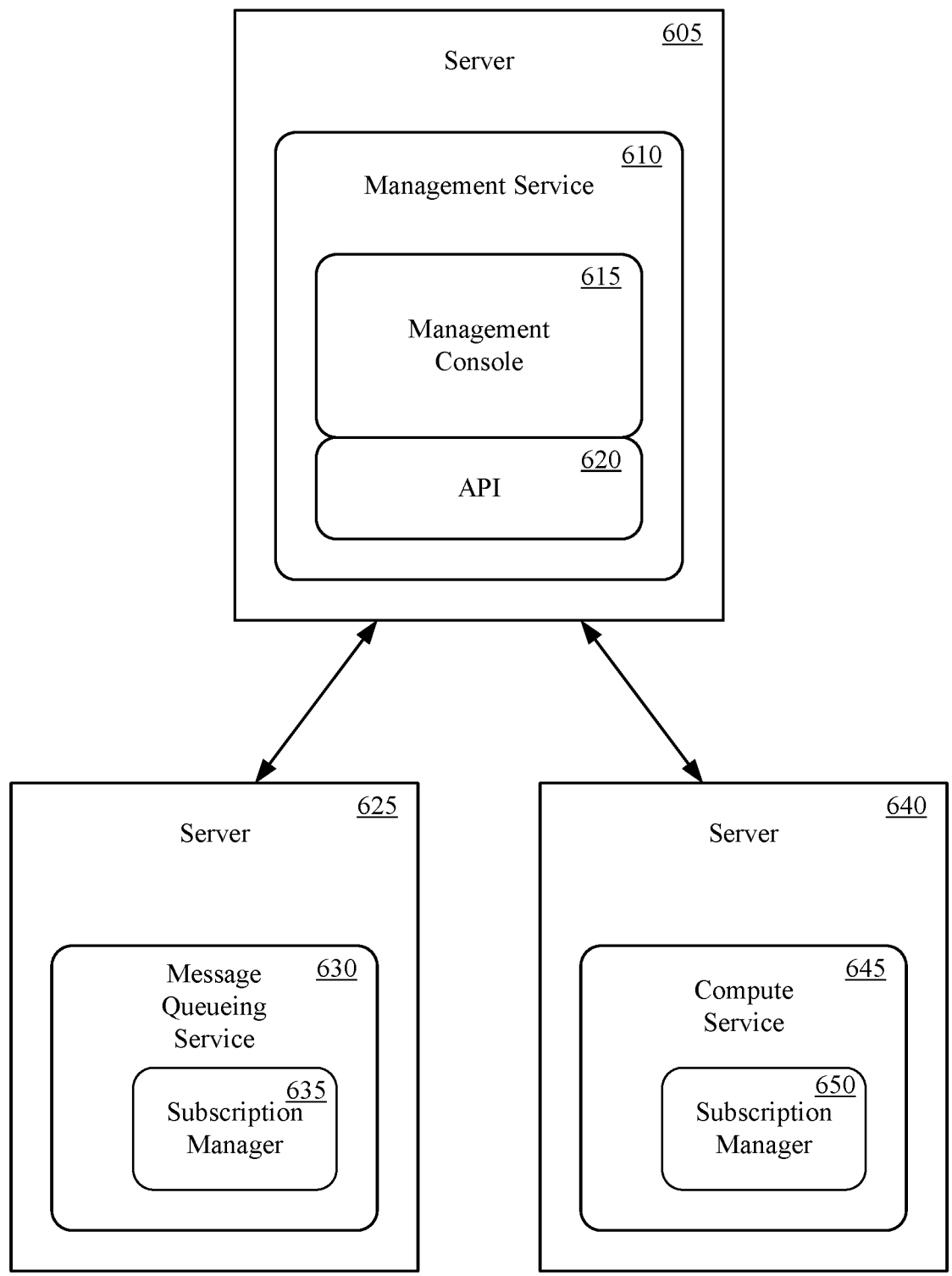
FIG. 6 is a block diagram that illustrates an example management service for configuration of a message processing system in a service provider environment according to an example of the present technology.

FIG. 6 illustrates an example management service for configuration of a serverless message processing system in a service provider environment according to an example of the present technology. The service provider environment may include one or more servers 605, 625, 640 for executing computing instances that can host various services.

One or more servers 605 may include one or more computing instances that host a management service 610. In one aspect, the management service 610 can include a management console 615 and an Application Programming Interface (API) 620. One or more servers 625 may include one or more computing instances that host a message queueing service 630. In one aspect, the message queueing service 630 can include a subscription manager 635. One or more servers 625 may include one or more computing instances that host a serverless compute service 645. In one aspect, the serverless compute service 645 can include a subscription manager 650.

In one aspect, the management console 615 can receive parameters of a given stateless compute function of a serverless compute service and attributes of a given messaging queue of a message queueing service. More specifically, parameters identifying the serverless compute service and/or the stateless compute function, and/or specifying attributes of the serverless compute service and/or the stateless compute function can be received. Similarly, parameters identifying the message queueing service and/or the messaging queue, and/or specifying attributes of the message queueing service and/or the given messaging queue can be received. The received parameters may also include access permissions and/or policies related to the serverless compute service, the given stateless compute function, the message queueing service and/or the given messaging queue. In one aspect, the management console 615 may provide a user interface for receiving the parameters from a user. In another aspect, the API 620 can programmatically receive the parameters.

In one example, the management console 615 and/or the API 620 may generate subscription information associating the messaging queue and the stateless compute function using the received parameters for the given stateless compute function of the serverless compute service and/or the received parameters for the given messaging queue of the message queueing service. In one aspect, the API 620 can provide the subscription information to the subscription manager 635, 650 of the message queueing service 630 and/or the serverless compute service 645.

In one aspect, the subscription information maintained by the subscription manager 635, 650 of the message queueing service 630 and/or the serverless compute service 645 may be utilized for controlling invocation of one or more stateless compute functions provided by the serverless compute service for messages received in one or more messaging queues provided by the message queueing service 630 as described in relation to FIGS. 1, 2, 4 and 5.

Figure 7:
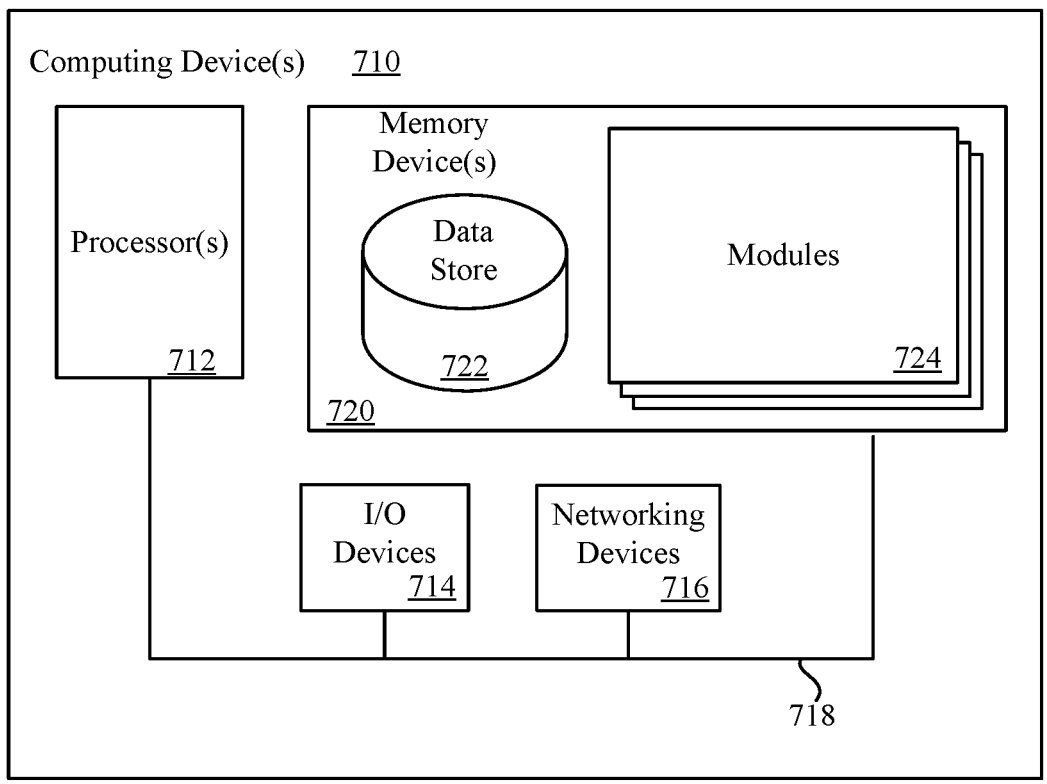
FIG. 7 is a block diagram that illustrates an example computing device that may be employed in the present technology.

FIG. 7 illustrates a computing device 710 on which modules of this technology may execute. A computing device 710 is illustrated on which a high level example of the technology may be executed. The computing device 710 may include one or more processors 712 that are in communication with memory devices 720. The computing device 710 may include a local communication interface 718 for the components in the computing device. For example, the local communication interface 718 may be a local data bus and/or any related address or control busses as may be desired.

The memory device 720 may contain modules 724 that are executable by the processor(s) 712 and data for the modules 724. The modules 724 may execute the functions described earlier. A data store 722 may also be located in the memory device 720 for storing data related to the modules 724 and other applications along with an operating system that is executable by the processor(s) 712.

Other applications may also be stored in the memory device 720 and may be executable by the processor(s) 712. Components or modules discussed in this description that may be implemented in the form of software using high programming level languages that are compiled, interpreted or executed using a hybrid of the methods.

The computing device may also have access to I/O (input/output) devices 714 that are usable by the computing devices. Networking devices 716 and similar communication devices may be included in the computing device. The networking devices 716 may be wired or wireless networking devices that connect to the internet, a LAN, WAN, or other computing network.

The components or modules that are shown as being stored in the memory device 720 may be executed by the processor(s) 712. The term "executable" may mean a program file that is in a form that may be executed by a processor 712. For example, a program in a higher level language may be compiled into machine code in a format that may be loaded into a random access portion of the memory device 720 and executed by the processor 712, or source code may be loaded by another executable program and interpreted to generate instructions in a random access portion of the memory to be executed by a processor. The executable program may be stored in any portion or component of the memory device 720. For example, the memory device 720 may be random access memory (RAM), read only memory (ROM), flash memory, a solid state drive, memory card, a hard drive, optical disk, floppy disk, magnetic tape, or any other memory components.

The processor 712 may represent multiple processors and the memory device 720 may represent multiple memory units that operate in parallel to the processing circuits. This may provide parallel processing channels for the processes and data in the system. The local interface 718 may be used as a network to facilitate communication between any of the multiple processors and multiple memories. The local interface 718 may use additional systems designed for coordinating communication such as load balancing, bulk data transfer and similar systems.

Subscribing stateless compute functions of a serverless compute service to messaging queues of a message queueing service advantageously allows the serverless compute service to be automatically invoked on every message to the queue. Serverless compute service integration with the message queueing service advantageously reduces complexity of message processing code and infrastructure, and improve efficiency and latency.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, non-transitory media such as RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A method, comprising:
   determining, using subscription information, a resource name identifying a stateless compute function;
   linking the stateless compute function to a messaging queue using the resource name;
   receiving a queue message at a queue storage service in a service provider environment;
   determining that the queue message is stored in the messaging queue associated with the queue storage service;
   invoking the stateless compute function on the queue message; and
   processing the queue message using the invoked stateless compute function.

2. The method of claim 1, wherein invoking the stateless compute function on the queue message further comprises:
   invoking the stateless compute function on the queue message based at least in part on a message event basis associated with a trigger.

3. The method of claim 1, wherein invoking the stateless compute function further comprises batch processing queue messages in the queue storage service using the stateless compute function.

4. The method of claim 1, further comprising:
   determining, using the subscription information, an input resource name associated with an input to the stateless compute function.

5. The method of claim 1, further comprising:
   determining, using the subscription information, an output resource name associated with an output for the stateless compute function; and
   linking the stateless compute function to another messaging queue using the resource name.

6. The method of claim 1, further comprising:
   determining one or more parameters identifying the messaging queue using the subscription information; and
   binding, using the one or more parameters identifying the messaging queue, the stateless compute function to the messaging queue.

7. The method of claim 1, further comprising:
   determining metadata associated with the queue message using the subscription information; and
   binding, using the metadata, the stateless compute function to the messaging queue.

8. The method of claim 1, further comprising:
   determining a policy associated with the subscription information; and
   invoking the stateless compute function based at least in part on the policy associated with the subscription information.

9. The method of claim 1, further comprising:
   tracking a metric associated with invocation of the stateless compute function.

10. A method, comprising:
    determining, using subscription information, a resource name identifying a stateless compute function;

linking the stateless compute function to a messaging queue of a queueing service in a service provider environment using the resource name;
receiving a message at the messaging queue;
determining that the message is stored in the messaging queue associated with the queueing service;
invoking the stateless compute function associated with the messaging queue; and
processing the message using the invoked stateless compute function.

11. The method of claim 10, wherein invoking the stateless compute function further comprises invoking the stateless compute function on a message event basis associated with a trigger.

12. The method of claim 10, further comprising:
determining metadata associated with the message; and
invoking the stateless compute function using the metadata.

13. The method of claim 10, further comprising:
determining, using the subscription information, an input resource name associated with an input to the stateless compute function.

14. The method of claim 10, further comprising:
determining a policy associated with the subscription information; and
invoking the stateless compute function based at least in part on the policy associated with the subscription information.

15. The method of claim 10, further comprising:
tracking a metric associated with invocation of the stateless compute function.

16. The method of claim 10, wherein processing the message using the invoked stateless compute function comprises:
processing the message using the invoked stateless compute function to process images uploaded to a website.

17. The method of claim 10, wherein processing the message using the invoked stateless compute function comprises:
processing the message using the invoked stateless compute function to respond to website clicks originating from third party systems.

18. The method of claim 10, wherein processing the message using the invoked stateless compute function comprises:
processing the message using the invoked stateless compute function to process to sensor reading from an Internet-of-things (IoT) connected device.

19. The method of claim 10, wherein invoking the stateless compute function further comprises batch processing the message in the queueing service using the stateless compute function.

\* \* \* \* \*